L. J. FAIRBANKS.
INSECT POISON SUPPLY CONTAINER.
APPLICATION FILED JAN. 7, 1919.
1,327,230.
Patented Jan. 6, 1920.
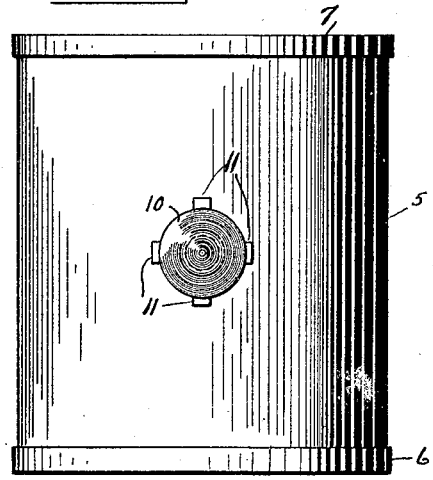
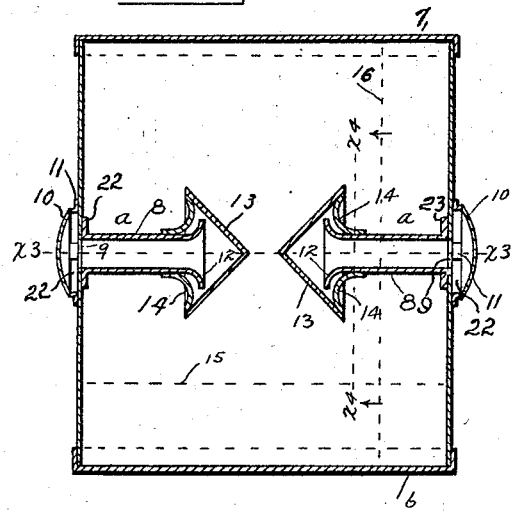
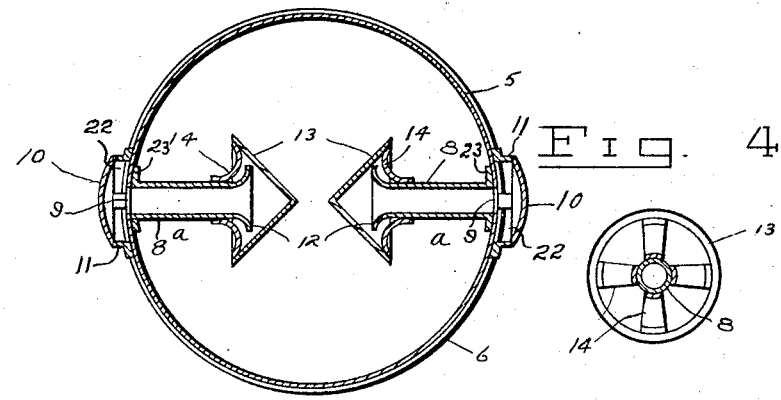
Inventor
Luke J. Fairbanks,
By
His Attorney.

UNITED STATES PATENT OFFICE.

LUKE J. FAIRBANKS, OF LOS ANGELES, CALIFORNIA.

INSECT-POISON-SUPPLY CONTAINER.

1,327,230.  Specification of Letters Patent.  Patented Jan. 6, 1920.

Application filed January 7, 1919. Serial No. 270,006.

*To all whom it may concern:*

Be it known that I, LUKE J. FAIRBANKS, a citizen of the United States, residing at Los Angeles, in the county of Los Angeles and State of California, have invented new and useful Improvements in Insect-Poison-Supply Containers, of which the following is a specification.

This invention relates to insect poison supply containers, and more particularly to dispensers for containing and providing for withdrawal, under pre-determined limitations or conditions, such substances as poisons, against the convenient and easy withdrawal or extraction, of which it is desired to make suitable provision. Particularly the invention is adapted for the containing and dispensing of such poisons as ant paste, or other fluid or viscous or semi-fluid materials, which are extremely poisonous in nature. It is customary to spread such materials about living premises as a protection against invasion by ants, or for exterminating ants which invade such premises. In accordance with the invention its poisonous substance may be retained within the dispensing can or container, practically proof against inadvertent extraction or withdrawal, suitable provision being made within such considerations of protection, for the entry of the ants or other insects within the container, so that they may have access to the poison within such container, thus obviating the necessity of openly placing such poison about the premises. Numerous uses for such dispensing devices will readily suggest themselves, and the invention is not to be understood as actually or impliedly limited in its relations to any one particular character or quality of contents or nature of use. In addition, the invention has for its object the provision of an improved dispensing device of the general nature stated, which will be superior in point of relative simplicity and inexpensiveness of construction, taken in conjunction with durability, and general efficiency and serviceability.

The invention consists in the novel and useful provision, formation, construction, association and combination of parts and features hereinafter described, shown in the drawing and finally pointed out in claims.

In the drawing:

Figure 1 is a side elevation of a dispensing device constructed to embody the invention;

Fig. 2 is a central vertical sectional view of the showing in Fig. 1;

Fig. 3 is a transverse horizontal sectional view taken upon the line $x^3$—$x^3$, Fig. 2; and Fig. 4 is a detail vertical sectional view taken upon the line $x^4$—$x^4$, Fig. 2, and looking in the direction of the appended arrows.

Corresponding parts in all the figures are designated by the same reference characters.

Referring with particularity to the drawing, the dispensing device therein shown is constructed to include a container 5 having a closed bottom member 6 and a closed top member 7, both of which are securely attached to the container body after the contents have been introduced therein. $a$ in each instance designates a member for permitting access to the contents of the container, or establishing communication between the interior and exterior of the container, while preventing free and easy extraction or withdrawal of such contents or access thereto, and likewise preventing inadvertent extraction or withdrawal of such contents. Each of these members comprises a tube 8 which extends preferably radially inwardly from the side wall of the container, registering with an opening 9 in such side wall, such opening 9 being covered by a shield or protective hood 10. The edges of the hoods 10 are attached to the container by short feet 11 which leave narrow slits or openings 22, of a size, for instance, sufficiently ample to permit entry of ants or other insects within such tubes. The outer ends of the tubular arms 8 are shown on the drawing as formed with the flanges 23 which may be soldered or otherwise rigidly secured to the walls of the container. The inner ends of the tubes are spaced somewhat apart and are preferably flared as at 12, and over each such flared mouth is provided a protective hood 13, preferably conical, and connected with the respective tube 8 by a plurality of spaced arms or brackets 14.

In using the device a level of contents, such as plastic or semi-liquid and paste, is preferably established in the zone somewhat beneath the zone of the tubes or members $a$, as indicated at 15. Correspondingly such level would be substantially at 16 if the container were turned onto its side, and in either case would fall short of the orifice of the bell mouth 12 of any one of the tubes.

Thus none of the contents could find its way by gravity or flow out through any one of the tubes. Also the bell mouths 12 and the hoods 13 will prevent invasion of the tubes 8 by such contents, under ordinary conditions, even including a reasonable amount of inversion or shake of the container. Access to the interior of the container for ants and other insects is, however, permitted through the openings 22, the tubes 8, and the spaces between the arms or brackets 14. Such insects then travel along the interior of the tubes 8 and down the inner walls or surfaces of the container, until they come to the contents which they devour or which has its proper effect, all in accordance with the nature of the insect and such contents. In the case of ants they will be found to take up a certain quantity of the contents and then to have egress from the container by a course the reverse of that last mentioned.

The invention thus renders approximately safe the use of poisons for exterminating insects, and as above noted, will be found to be adaptable in a wide range of practical and beneficial uses.

The container is entirely closed excepting for the openings 9 for the tubes 8, so that contents cannot be removed at any point other than as provided and controlled through the tubes and their adjuncts.

It is manifest that many changes may be made in the details of construction of the device, without departing from the true spirit of the invention.

Having thus disclosed my invention, I claim and desire to secure by Letters Patent:

1. A container of the character described, including a hollow shell having an opening in one of the inclosing walls thereof, a tubular arm extending inwardly within the shell and communicating with the opening, and a guard plate extending transversely across an end of the arm and held in a spaced relation thereto to provide small passages around the edge of the guard plate through which insects can enter or leave the tubular arm, the said arm terminating in a spaced relation to the walls of the shell so that the level of any contents within the shell will tend to assume a position below the end of the tubular arm, regardless of the position in which the container is supported.

2. A container of the character described, including a hollow shell provided with an opening in one of the inclosing walls thereof, a tubular arm extending inwardly within the shell and in communication with the opening, a guard plate extending transversely across the end of the tubular arm and having a larger size than the sectional area of the tubular arm, means for supporting the guard plate in a slightly spaced relation from the tubular arm to provide small passages around the edge of the guard plate through which insects can enter or leave the tubular arm, the said tubular arm terminating in a spaced relation to the walls of the shell so that the level of any contents within the shell will tend to assume a position below the end of the tubular arm, regardless of the position in which the container is supported.

3. A device of the character disclosed, comprising a container provided with an opening and with a tubular member ranging inwardly of the container from and communicating with said opening; means being provided for preventing the direct entrance of said tubular member in either direction; said last named means comprising protective hoods respectively over said opening and the inner end of said tube, the latter protective hood being in part spaced from said inner end of said tube.

4. A container of the character described, including a hollow shell having an opening in one of the inclosing walls thereof, a tubular arm extending within the shell and in communication with the opening, a concave guard plate supported upon the inner end of the tubular arm in a spaced relation thereto, so that a narrow passage is provided between the end of the tubular arm and the guard plate, and a second guard plate arranged upon the exterior of the shell and extending transversely across the opening thereof, said second guard plate being supported in a slightly spaced relation to the shell so that a narrow passage is provided around the edge of the guard plate through which insects can enter or leave the tubular arm, said guard plates tending to prevent any contents of the shell being dissipated through the tubular arm and at the same time enabling insects to enter or leave the shell through the tubular arm.

In testimony whereof, I have signed my name to this specification in the presence of two subscribing witnesses.

LUKE J. FAIRBANKS.

Witnesses:
RAYMOND IVES BLAKESLEE,
EDNA TURNER.